(12) United States Patent
Sehgal

(10) Patent No.: US 11,743,311 B2
(45) Date of Patent: Aug. 29, 2023

(54) ADAPTIVE BITRATE OPTIMIZATION UPON VIDEO STREAMING INITIALIZATION

(71) Applicant: SLING MEDIA PVT LTD, Bangaluru (IN)

(72) Inventor: Sagar Sehgal, Bangaluru (IN)

(73) Assignee: DISH Network Technologies India Private Limited

( * ) Notice: Subject to any disclaimer, the term of this patent is extended or adjusted under 35 U.S.C. 154(b) by 19 days.

(21) Appl. No.: 17/365,396

(22) Filed: Jul. 1, 2021

(65) Prior Publication Data

US 2021/0329049 A1 Oct. 21, 2021

Related U.S. Application Data

(63) Continuation of application No. 16/686,479, filed on Nov. 18, 2019, now Pat. No. 11,089,070, which is a (Continued)

(30) Foreign Application Priority Data

Dec. 28, 2017 (IN) .............................. 201741046979

(51) Int. Cl.
*H04L 65/613* (2022.01)
*H04N 21/24* (2011.01)
(Continued)

(52) U.S. Cl.
CPC .......... *H04L 65/613* (2022.05); *G06F 3/0484* (2013.01); *H04L 65/60* (2013.01);
(Continued)

(58) Field of Classification Search
CPC ....... H04L 65/60; H04L 65/80; H04L 65/612; H04L 65/613; G06F 3/0484;
(Continued)

(56) References Cited

U.S. PATENT DOCUMENTS 7,373,415 B1 5/2008 Deshan et al.
9,686,332 B1 6/2017 Binns et al.
(Continued)

FOREIGN PATENT DOCUMENTS

WO 2016154189 A1 9/2016

OTHER PUBLICATIONS

EPO, International Search Report issued in IA No. PCT/IN2018/050865, dated Mar. 17, 2019.

*Primary Examiner* — Brian Whipple
(74) *Attorney, Agent, or Firm* — KW Law, LLP

(57) ABSTRACT

Devices, methods, and program products are provided enabling Adaptive Bitrate (ABR) optimization upon initialization of a streaming video session. In embodiments, the method includes launching a streaming media interface application in response to user input. Substantially concurrently with application launch, the client media receiver further transmits a request over a communications network to a streaming media server for a sample video stream. As the video stream is received, the client media receiver plays the sample video stream as, for example, a background process. When subsequently receiving user input selecting streaming content for end user viewing, the client media receiver determines an optimized ABR setting based upon a recent ABR value of the sample video stream. The client media receiver transmits a request to the streaming media server for user-selected content stream at the optimized ABR setting and then presents the content stream for end user viewing.

20 Claims, 2 Drawing Sheets

Figure 1:
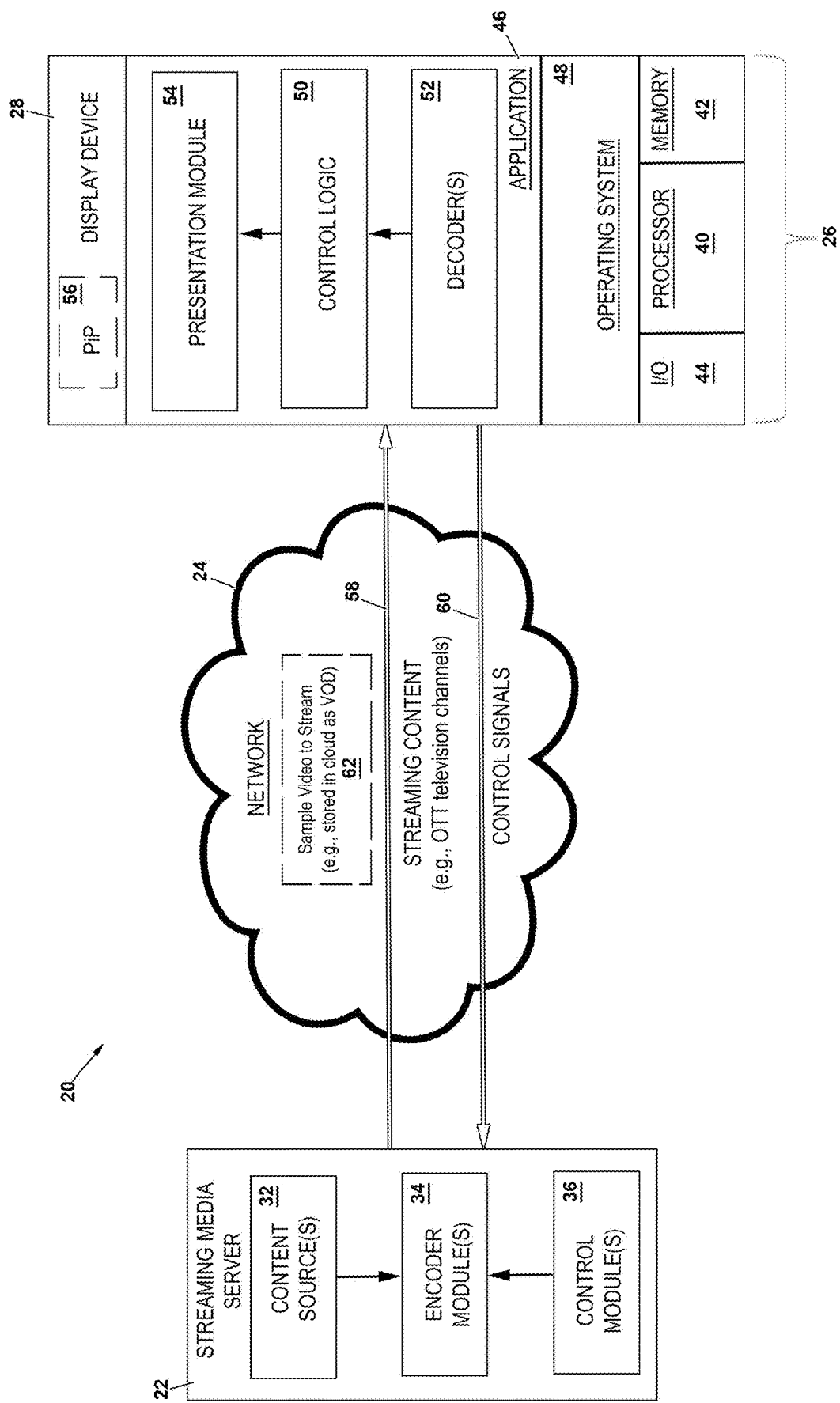

Related U.S. Application Data continuation of application No. 15/892,909, filed on Feb. 9, 2018, now Pat. No. 10,523,727.

(51) Int. Cl.
| | |
|---|---|
| *H04L 65/60* | (2022.01) |
| *H04N 21/472* | (2011.01) |
| *H04L 65/80* | (2022.01) |
| *H04L 65/612* | (2022.01) |
| *G06F 3/0484* | (2022.01) |
| *H04N 21/2662* | (2011.01) |
| *H04N 21/238* | (2011.01) |
| *H04N 21/234* | (2011.01) |

(52) U.S. Cl.
CPC ............ *H04L 65/612* (2022.05); *H04L 65/80* (2013.01); *H04N 21/234* (2013.01); *H04N 21/238* (2013.01); *H04N 21/2402* (2013.01); *H04N 21/2407* (2013.01); *H04N 21/2408* (2013.01); *H04N 21/2662* (2013.01); *H04N 21/47202* (2013.01)

(58) Field of Classification Search
CPC ............... H04N 21/234; H04N 21/238; H04N 21/2402; H04N 21/2407; H04N 21/2408; H04N 21/2662; H04N 21/47202
See application file for complete search history.

(56) References Cited

U.S. PATENT DOCUMENTS

| | | |
|---|---|---|
| 2002/0165970 A1 | 11/2002 | Ludewig |
| 2009/0216872 A1 | 8/2009 | Albig et al. |
| 2010/0077099 A1 | 3/2010 | Gordon |
| 2012/0203886 A1 | 8/2012 | Mavromatis |
| 2013/0007263 A1 | 1/2013 | Soroushian et al. |
| 2015/0381690 A1 | 12/2015 | Schmidt et al. |

ADAPTIVE BITRATE OPTIMIZATION UPON VIDEO STREAMING INITIALIZATION

CROSS-REFERENCE TO RELATED APPLICATIONS

This application claims priority to Indian Provisional Patent Application Number 201741046979, filed Dec. 28, 2017, the U.S. patent application Ser. No. 15/892,909 (U.S. Pat. No. 10,523,727) filed on Feb. 9, 2018, and the U.S. patent application Ser. No. 16/686,479 filed on Nov. 18, 2019, the contents of which are hereby incorporated by reference.

TECHNICAL FIELD

The following disclosure generally relates to media streaming and, more particularly, to devices, methods, and program products enabling ABR optimization upon initialization of a streaming video session, such as an OTT television session.

Abbreviations

Abbreviations appearing less frequently in this document are defined upon initial usage, while abbreviations appearing with greater frequency are defined below.
ABR—Adaptive Bitrate;
CDN—Content Delivery Network;
DVR—Digital Video Recorder;
GUI—Graphical User Interface;
PiP—Picture-in-Picture;
OS—Operating System;
OTT—Over-The-Top;
STB—Set-Top Box; and
VOD—Video-On-Demand.

BACKGROUND

The term "streaming video" generally refers to the reception of multimedia content, such as television programming and other audiovisual content, through a communications network at a bitrate enabling presentation of the content in real time as it is received. Streaming video may be viewed live or on-demand and transmitted by, for example, a VOD provider, a remotely-controlled placeshifting device, or a pay television provider delivering television programming via cable, satellite, or Internet (OTT) distribution channels. In the case of VOD or OTT television services, the media content may be stored in a pre-encoded format and distributed to a client media receiver, such as a mobile phone or STB, over a CDN. In the case of placeshifted media, a DVR, STB, or a similar device having placeshifting capabilities and located within a user's residence may encode and transmit selected streaming video to a client media receiver, such as a mobile phone or tablet, operated by the end user.

Media streaming services enhance the ease and convenience with which end users view streaming video content, such as VOD, OTT television, and placeshifted media content. Media streaming services are, however, inherently limited by resource constraints affecting network reliability and bandwidth availability. When network bandwidth becomes undesirably constrained during a streaming video session, latencies may occur resulting in prolonged buffering and other delays in the presentation of streaming video content. Network latencies can also result in sluggish response times in implementing user-issued commands during a streaming video session, such as commands issued by a user to change channels when streaming OTT television content. ABR streaming techniques have been developed and are now widely employed to enhance streaming video performance despite such variances in network bandwidth and other constraining factors. Further advancements in ABR streaming techniques remain desirable, however, as consumer demands and expectations continue to grow for near instantaneous, seamless streaming of various types of digital media content.

BRIEF SUMMARY

Devices, methods, and program products are provided enabling ABR optimization upon initialization of a streaming video session, such as an OTT television session. In various embodiments, the method includes the step or process of launching a streaming media interface application in response to user input. Substantially concurrently with application launch, the client media receiver further transmits a request over a communications network to a streaming media server for a sample video stream, which may contain or be transmitted in conjunction with an accompanying audio stream. As the video stream is received, the client media receiver plays the sample video stream as a background process. The sample video stream may be visually or audibly perceptible to the end user operating the client media receiver in certain embodiments, but will often be largely if not wholly imperceptible to the end user; e.g., the video may be loaded into a hidden layer of the media player, and any accompanying audio may be muted. When subsequently receiving user input selecting streaming content for end user viewing, the client media receiver determines an optimized ABR setting based upon the most recent ABR value of the sample video stream. The client media receiver transmits a request to the streaming media server for user-selected content stream at the optimized ABR setting; and, as upon reception of the requested content stream, presents the content stream on a display device associated with (included within or otherwise operably connected to) the client media receiver for end user viewing.

The methods described above and described elsewhere in this document can be implemented utilizing complementary program products, such as software applications executed on suitably-equipped client media receivers and streaming media servers. Various additional examples, aspects, and other useful features of embodiments of the present disclosure will also become apparent to one of ordinary skill in the relevant industry given the additional description provided below.

BRIEF DESCRIPTION OF THE DRAWING FIGURES

Figure 2:
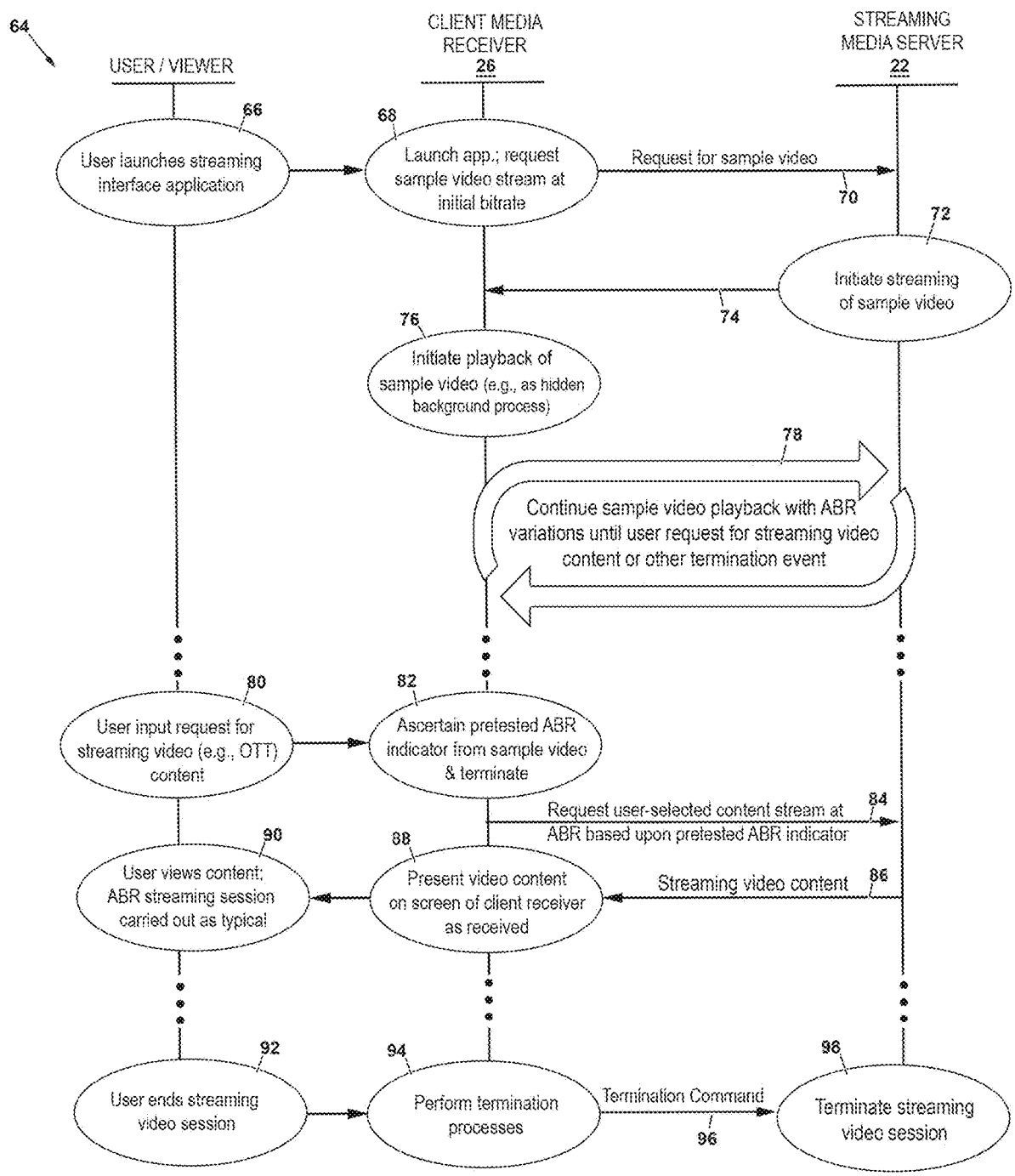

Exemplary embodiments will hereinafter be described in conjunction with the following drawing figures, wherein like numerals denote like elements, and:

FIG. 1 is a schematic illustrating a streaming video session established between a streaming media server and a client media receiver, such as a user-operated smartphone, tablet, or STB, as illustrated in accordance with an exemplary embodiment of the present disclosure; and FIG. 2 is a message timing diagram of an exemplary transmission sequence between the streaming media server and the client media receiver illustrated in FIG. 1 during a streaming video session.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

The following describes devices, systems, methods, and program products for optimizing ABR selection when initializing a streaming video session. Embodiments of the present disclosure anticipate the likely initiation of a media streaming session by, for example, monitoring for startup or launch of a streaming media interface application; that is, a software application executed on an electronic device (herein, a "client media receiver") and principally utilized to support the browsing, selection, and viewing of streaming media content, such as OTT television content. The client media receiver can assume the form of, for example, an STB, smartphone, tablet computer, or a wearable device. When a user launches a streaming media interface application on the OS of the client media receiver, the client media receiver may automatically (that is, without requiring additional user input) transmit a request to a streaming media server for a sample video stream. The client media receiver then receives and plays this sample video stream utilizing a player executing on the receiver OS, with ABR streaming modulation or variation applied. The sample video stream may be continuous stream of essentially infinite length, which is played in an uninterrupted manner by the receiver player. Alternatively, the sample video stream may have a fixed duration and be repeated or looped with little to no delay between the end of one iteration of the sample video stream to the beginning of the next. As a still further possibility, the sample video stream may be video clip of a relatively short duration (e.g., on the order of a few seconds), which is requested by, transmitted to, periodically played by the client media receiver at predetermined intervals of a longer duration (e.g., on the order of a minute or more).

Playback of the sample video stream may or may not be perceptible to the end user operating the client media receiver. For example, in certain embodiments, the sample video stream may be played in a hidden layer or view of the media player, and any accompanying audio may be muted. In other embodiments, the sample video stream and any accompanying audio may be visually and audibly perceptible to the end user; e.g., the sample video stream may be presented in a PiP, side-by-side, or other shared screen format allowing viewing of the video stream in conjunction with the GUI of the streaming media interface application. This latter approach may be useful when the sample video stream contains promotional or informational material desirably presented to the end user. As a still further possibility, the sample video stream may be obscured or hidden from user viewing (e.g., again, by loading the sample video stream in a hidden layer of the default media player), while an accompanying audio stream may be made audible. Such an approach may be employed when background music and/or audible messages, which contain information regarding the streaming media interface application, are desirably conveyed to the end user as he or she interacts with the streaming media interface application.

Regardless of whether the sample video stream is perceptible to an end user, the sample video stream may be played on a continuous or iterative basis until receipt of user input at the client media receiver selecting streaming content desirably viewed by the end user. In response to receipt of such user-selection input, the client media receiver sends a command to the streaming media receiver to cease transmission of the sample video stream, while commencing streaming transmission of the user-selected media content at an optimized ABR setting. The client media receiver determines the optimized ABR setting based upon a recent, and preferably the most recent or timely, ABR value of the sample video stream. For example, if the client media receiver last received the sample video stream as at a moderate ABR value (e.g., as a variant stream having an intermediate bandwidth), the client media receiver may request that the user-selected media content is likewise initially provided by the streaming media server at the intermediate bandwidth or, perhaps, at an initial bandwidth slightly less than (e.g., one available graduated setting below) the intermediate bandwidth. The client media receiver may then present user-selected media content as the media content is received from the streaming media server, while modulating the ABR value or quality of the video stream as the streaming video session progresses in the typical manner. Through the performance of such processes, the client media receiver helps ensure that the user-selected streaming content is received in a rapid manner and playback of the content occurs smoothly without stall or interruption.

Turning now to FIG. 1, there is schematically shown a streaming media system 20, which is depicted in accordance with an embodiment of the present disclosure. In the illustrated example, streaming media system 20 includes a streaming media server 22, a client media player or receiver 26, and a display device 28. During operation of streaming media system 20, bidirectional communication between streaming media server 22 and client media receiver 26 occurs through a communications network 24, while client media receiver 26 outputs video and possibly audio signals over a wired or wireless connection to display device 28. Display device 28 may or may not be integrated into client media receiver 26 as a single device. Further, each of the foregoing components can be implemented utilizing any suitable number and combination of known devices including microprocessors, memories, power supplies, storage devices, interface cards, and other standard components. Such components may include or cooperate with any number of software programs or instructions designed to carry-out the various methods, process tasks, encoding and decoding algorithms, and relevant display functions described herein. Streaming media system 20 may also contain other conventionally-known components, which are not shown in FIG. 1 to avoid unnecessarily obscuring the drawing.

Streaming media server 22 can assume the form of any device, system, or component suitable for obtaining content from one or more content sources 32, encoding the content utilizing one or more encoder modules 34 under the command one or more control modules 36, and transmitting the encoded content to streaming media server 22 over communications network 24. As generically shown in FIG. 1, modules 34, 36 can be implemented utilizing software, hardware, firmware, and combinations thereof. The encoded channel streams will often contain both video and audio component streams, which may be combined with other streaming data including packet identification data. Any currently-known or later-developed packetized format can be employed by streaming media server 22 including, but not limited to, MPEG, QUICKTIME, WINDOWS MEDIA, and other formats suitable for transmission over communications network 24. In implementations, streaming media server 22 functions as an OTT server, which provides a streaming channel bundle to client media receiver 26 pursuant to a (e.g., subscription-based) streaming OTT linear TV service.

Communications network 24 may generally encompass any number of digital or other networks enabling multiple nodes or devices (e.g., streaming media server 22 and client media receiver 26) to communicate utilizing any common protocols and signaling schemes. Communications network 24 can include one or more open CDNs, Virtual Private Networks (VPNs), the Internet, and various other communications networks implemented in accordance with TCP/IP protocol architectures or other conventional protocols. In embodiments, communications network 24 may further encompass one or more wired or wireless local area networks (LANs), wide area networks (WANs), cellular networks, and/or any other pubic or private networks. Communications network 24 as illustrated in FIG. 1, then, is intended to broadly encompass any communications network(s), systems, or architectures for transmitting data between the various components of streaming media system 20.

Client media receiver 26 can be any device, system, player, or the like suitable for performing the processes described herein. A non-exhaustive list of such devices includes mobile phones, laptop computers, desktop computers, wearable devices, gaming consoles, tablets, DVRs, and STBs. When engaged in a streaming video session, client media receiver 26 outputs visual signals for presentation on display device 28. Display device 28 can be integrated into client media receiver 26 as a unitary system or electronic device. This may be the case when receiver 26 assumes the form of a mobile phone, tablet, laptop computer, or similar electronic device having a dedicated display screen; although it will be appreciated that such devices may still be capable of wirelessly transmitting or "casting" a video signal to a separate, standalone display device in embodiments. Alternatively, display device 28 can assume the form of an independent device, such as a freestanding monitor or television set, which is connected to client media receiver 26 (e.g., a gaming console, DVR, STB, or similar peripheral device) via a wired or wireless connection. Video output signals generated by client media receiver 26 may be formatted in accordance with conventionally-known standards, such as S-video, High-Definition Multimedia Interface (HDMI), Sony/Philips Display Interface Format (SPDIF), Digital Visual Interface (DVI), or IEEE 1394 standards.

Client media receiver 26 may contain at least one processor 40 configured to selectively execute software instructions, in conjunction with associated memory 42 and conventional Input/Output (I/O) features 44. I/O features 44 can include a network interface, an interface to mass storage, an interface to display device 28, and/or various types of user input interfaces. Client media receiver 26 may execute a software program or application 46 directing the various hardware features of client media receiver 26 to perform the functions described herein. Application 46 suitably interfaces with processor 40, memory 42, and I/O features 44 via any conventional operating system 48 to provide such functionalities. Software application can be a streaming media interface application in embodiments in which streaming media server 22 assumes the form of a STB, DVR, or similar electronic device having placeshifting capabilities and, in many cases, located within the residence of an end user. In certain implementations, client media receiver 26 may be realized utilizing special-purpose hardware or software, such as the SLINGCATCHER-brand products available from Sling Media, Inc., presently located in Foster City, Calif.

As schematically shown in FIG. 1, streaming media interface application 46 suitably includes control logic 50 adapted to process user input, obtain streaming content (e.g., streaming OTT channels) 58 from one or more content sources 32 included within or in communication with server 22, decode received media streams, and supply corresponding output signals to display device 28. Streaming content 58 can be decoded utilizing known techniques and hardware, such as one or more decoding modules included in receiver 26. When present, such decoding module(s) may be implemented using specialized hardware or software executing on processor 40. Decoded programming can be provided to a presentation module 54, which then generates output signals to display device 28. In some embodiments, presentation module 54 may combine decoded programming from multiple streaming channels to create a blended or composite image; e.g., as schematically indicated in FIG. 1, one or more PIP images 56 may be superimposed over a main or primary image generated on a screen of display device 28.

In operation, control logic 50 of client media receiver 26 obtains programming in response to end user input received at I/O features 44 of receiver 26. Control logic 50 may establish a control connection with remote streaming media server 22 via communications network 24 enabling the transmission of commands from control logic 50 to control module 36. Streaming media server 22 may operate by responding to commands received from a client media receiver 26 via network 24, as indicated in FIG. 1 by arrow 60. Such commands may include information utilized to initiate a streaming video session, such as a placeshifting or OTT television session, with streaming media server 22 possibly including data supporting mutual authentication of server 22 and receiver 26. When streaming media server 22 assumes the form of a consumer placeshifting device, such as a STB or DVR located in an end user's residence, control commands 60 may include instructions to remotely operate the placeshifting device, including to initiate and to change channels during an OTT session. Such commands may also be received at client media receiver 26 and forwarded to streaming media server 22, as appropriate, as a user navigates and otherwise interacts with the GUI of streaming media interface application 46 executing on receiver 26.

Upon user request for initiation of a streaming video session, client media receiver 26 determines an appropriate ABR value or setting at which to request a variant stream of the user-selected content to be received at receiver 26 and presented on display device 28. Conventionally, streaming media interface applications often utilize a default ABR value or setting in selecting bitrate of the stream. The default ABR value may be specified in a master playlist accessed by client media receiver 26, with the default rate predefined in some manner. For example, the default ABR value may be the bitrate of a variant playlist that is first listed or "on top" of a set in the master playlist. In other conventional approaches, the default ABR value utilized to initiate streaming may be selected as the lowest or highest quality stream available, with receiver 26 actively varying stream quality during the ensuing media streaming session as appropriate. Comparatively, embodiments of the present disclosure ascertain an optimal ABR value or setting under current network conditions, as monitored on a real-time or near real-time basis in anticipation of an impending streaming video session. This is accomplished through an ABR pretesting process, which allows initialization of a streaming video session, if and when requested by the end user, to occur substantially instantaneously at a pre-optimized ABR setting. An example of such an ABR pretesting process, which may be essentially transparent to the end user, will now be described in conjunction with FIG. 2.

FIG. 2 is a message timing diagram of an ABR pretesting process 64, as illustrated in accordance with an exemplary embodiment of the present disclosure. Process 64 commences when receiver 26 recognizes a likely intent on behalf of an end user to initiate a streaming video session in a near or imminent future timeframe. For example, receiver 26 may initiate process 64 in response to the launch of a streaming media interface application 46, such as an OTT streaming application (FUNCTION 66). Streaming media interface application may be launched in response to user request received at receiver 26. Such a user request can be entered by an end user into client media receiver 26 utilizing a user input interface (e.g., a keyboard, pointer device, touchscreen, scroll wheel, voice command system, remote control, etc.) included within I/O features 44 (FIG. 1) or otherwise operably coupled to client media receiver 26. Client media receiver 26 responds accordingly (FUNCTION 68) by launching the streaming media interface application. Substantially concurrently, client media receiver transmits a request to streaming media server 22 for a preliminary or sample video stream at an initial bitrate or ABR value (TRANSMISSION 70). In response, streaming media server 22 establishes a connection with client media receiver 26 and initiates streaming of the sample video (FUNCTION 72, TRANSMISSION 74). One way or two way authentication processes can also be performed, as desired.

In other embodiments, client media receiver 26 may recognize a different indicator signaling user intent to soon initiate a streaming video session, which then serves as a trigger for performing the remainder of ABR pretesting process 64. For example, client media receiver 26 may await certain additional actions or user input occurring after launch of the streaming media interface application prior to generating TRANSMISSION 70 of process 64, such as user browsing of available streaming content options. As a further possibility, client media receiver 26 may monitor a user's viewing behavior or habits and automatically perform ABR pretesting process 64 when predicting that a streaming media session is likely to be initiated by the end user in the immediate future. For example, in such embodiments, client media receiver 26 may predict a future intent of a user to engage in a streaming video session based upon established viewing schedule; e.g., as may be constructed when the end user reliably viewing streaming content at a particular time on a particular day of the week, with client media receiver 26 then initiating process 64 shortly before this time. Additionally or alternatively, client media receiver 26 may predict a future user intent to initiate a streaming video session based upon established viewer preferences; e.g., if the end user reliably watches the games of a particular sports team, client media receiver 26 may initiate process 64 shortly before an upcoming game played by the sports team. Such trigger events can be monitored for by client media receiver 26 in addition to or in lieu of launch of the streaming media interface application. Further, if a user does not initiate a streaming media session within a set time period after commencement of process 64, or if another termination event occurs (e.g., closing of streaming media interface application), ABR pretesting process 64 may be terminated by receiver 26 accordingly.

With continued reference to FIG. 2, the sample video streamed to client media receiver 26 in response to the request contained in TRANSMISSION 70 can assume various forms. In certain embodiments, selected live content can be requested and received from streaming media server 22 specific to the end user presently operating receiver 26; e.g., content can be loaded from the user's live channels catalog stored by the streaming media interface application. Alternatively, the sample video can be a generalized or universal media stream; e.g., a VOD file published in CDN, as indicated in FIG. 1 by box 62. As a still further possibility, client media receiver 26 may request content from a default streaming OTT channel for usage as the sample video stream. In this latter regard, a streaming OTT channel identified as a favorite (e.g., most frequently watched) of the end user or the last-viewed streaming OTT channel during the previous streaming session in which the end user engaged can be utilized as the sample video stream. In this manner, if a user should request to view the particular streaming OTT channel already provided to receiver 26 as the sample video stream, client media receiver 26 may simply transition from hiding or obscuring the video content and accompanying audio content (e.g., by playing the content in a hidden player layer or view on mute) to now presenting the video content and audio content in an unobscured, unmuted manner; e.g., by bringing the hidden player layer forward and deactivating mute mode.

In certain instances, the sample video stream may be supplied as a continuous stream, such as a streaming OTT television channel. In other instances, the sample video may be clip of a predetermined duration. In such embodiments, the sample video may be repeated or looped if a user has not selected content to stream or if a termination event has not been reached prior to conclusion of the sample video. Alternatively, the sample video may terminate after a single instance of playback or after a set number of playback instances, and client media receiver 26 may utilize the most recent data obtained from playback of the sample video when performing the below-described process steps. As a still further possibility, a sample video clip may be utilized of a first, relatively short duration (e.g., on the order of a few seconds), and requested by client media receiver 26 periodically at internals greater than the first duration (e.g., once every minute or two). Client media receiver 26 may again utilize the most recent data obtained from playback of the sample video when performing the below-described process steps. In this manner, it can be ensured that a relatively timely ABR optimized value can be ascertained upon streaming media selection by a user, while minimizing resource usage in requesting, receiving, and iteratively playing the sample video clip.

In implementations, the sample video stream can be video clip of a predetermined duration (e.g., on the order of several seconds to a few minutes), which is created with the end user's viewing interests in mind. Such a customized video clip can contain targeted advertisements customized to the end user based upon the user's past viewing behaviors, preferences specified by the user through the streaming media interface application or another online interface, or other information pertaining to the end user known to receiver 26 or server 22. Targeted advertisement may be automatically presented to the end user (that is, without requiring additional user input) upon startup of the streaming media interface application and leveraged as the sample video stream. In other implementations, customized video clips can be assembled from past events predicted to interest the end user, such as highlights captured from a sporting event involving a team frequently watched by the end user, highlights captured from programming of the type habitually viewed by the end user, or highlights from a speech given by a political figure followed by the user, to list but a few examples. Again, such a clip of highlights may be automatically presented to the end user upon startup of the streaming media interface application to enhance the user experience, while concurrently leveraging the streaming video content to perform ABR pretesting process 64 shown in FIG. 2.

Advancing next to FUNCTION 78 shown in FIG. 2, the sample video stream is played with ABR variations during process 64, whether continuously or periodically, until such time as a user request for selected streaming content is entered into receiver 26 (e.g., via application 46) or another termination event occurs. The ABR variations can be applied in essentially the same manner as is carried-out in typical streaming techniques; however, in embodiments of process 64, the sample video may be played as a background process in a manner unapparent to or hidden from the end user. For example, the sample video may be loaded into a hidden layer or player view, with mute mode activated, such that both the video and any accompanying audio is not visible on the screen of display device 28 nor is the audio made audible via associated speakers. Consequently, the end user may be unaware of the various additional process steps performed by client media receiver 26 (including the request, reception, and concealed or masked playback of the sample video) in determining an optimal starting ABR value for playback of user-selected content.

This foregoing notwithstanding, the possibility that the sample video may be visibly rendered on the screen of display device 28 or accompanying audio content made audible in further embodiments is not precluded, as may be desirable when the sample video contains branding information or other promotional media. Similarly, and as previously discussed, the sample video stream may be desirably presented to the end user when containing highlights or other content tailored to the end user's interests. Finally, as a still further possibility, only a portion or limited region of the sample video stream may be presented on display device 28 by client media receiver 26 in embodiments. For example, in one approach, the sample video stream may be played in a first window, which is located beneath or underlies a second window containing the GUI of the streaming media interface application. The second or "foreground" window may be sized such that only a portion of the first or "background" window is visible on the screen of display device 28; e.g., only a relatively thin bar or strip of the background window may be visible adjacent a lower, upper, or side edge of the foreground window. The sample video stream may contain promotional or informational content that is positioned to appear in this visible bar or strip of the background window. In this manner, such promotional or informational content can be presented in a manner appearing somewhat similar to conventional informational crawls or sidebar banner ads. At the same time, a larger or full image stream is transmitted to receiver 26 and played in the background window (as largely covered by the foreground window) to allow an accurate assessment of current network conditions supportive of ABR streaming.

The above-described process steps are repeated as appropriate until user input is received at client media receiver 26 selecting media content desirably streamed to receiver 26 for end user viewing (FUNCTIONS 80, 82). When this occurs, client media receiver 26 terminates playback of the sample video if applicable (via transmission of cessation command to server 22), and utilizes a recent (e.g., the latest) ABR value of the sample video as an indicator of an optimal ABR value at which streaming of the user-selected content may commence. For example, if the sample video was received as a moderate bandwidth stream upon sample video termination (FUNCTION 82), client media receiver 26 may determine that the user-selected streaming content is optimally received at a moderate bandwidth for responsive, lag-free streaming under the present network conditions. Stated differently, this information may be utilized by client media receiver 26 to identify and select most appropriate variant playlist (with bitrate less than or equal to the ABR value or pretested ABR indicator at which the sample video stream was last requested and received) to commence streaming of the user-selected content smoothly. Client media receiver 26 then provides the corresponding request to streaming media server 22 (FUNCTION 84), and receives in return the streaming video content 86 at the requested ABR value.

Client media receiver 26 presents the streaming media content on a display screen of display device 28 as the media content is received for end user viewing (FUNCTIONS 88, 90). Although not essential to process 64, ABR variation or modulation is usefully performed during the ensuing streaming session, with upgrades to stream quality (higher resolutions, higher rates, and the like) and downgrades to stream quality implemented in conjunction with fluctuations in network conditions to ensure substantially smooth, lag-free playback of the user-selected content. Finally, when the end user ultimately chooses to conclude the current streaming video session (FUNCTION 92), client media receiver 26 may engage in the appropriate shutdown or termination process (FUNCTION 94). In embodiments in which receiver 26 utilizes the last-viewed streaming OTT channel as the sample video, client media receiver 26 may store the identity of the last-viewed streaming OTT channel in memory. Client media receiver 26 then transmits a termination command to streaming media server 22 (TRANSMISSION 96), server 22 terminates the current streaming session (FUNCTION 98), and process 64 concludes.

In the above-described manner, process 64 enables client media receiver 26 and, specifically, application 46 to gauge most the appropriate indicated bitrate for stall-free playback of user-selected content under the current network conditions, as such conditions exist at the point in time a user requests initiation of a streaming video session. In embodiments, this may allow client media receiver 26 to select the optimal variant playlist (e.g., with bitrate less than or equal to the ABR value at which the sample stream was last received) to initiate playback of the user-selected content in a highly responsive and smooth manner. Notably, such a process provides a more accurate assessment of network conditions than do more simplistic testing processes. Consider, for example, a pin test during which an initial message or "ping" is sent to streaming media server 22 and the server's reply is then utilized to measure Round Trip Time (RTT). While relatively simple, such a ping test fails to take into account a comprehensive set of factors impacting the appropriate calibration of a desired optimal ABR value beyond RTT. These other factors may include (where appropriate) RTT for valid variant playlist (EVENT/LIVE type) updates, RTT of Transport Stream (TS) segments delivery, the current latency for content key retrieval and segment decryption, the time required for decoding, and consideration of processing tasks of the player for maintaining appropriate forward buffer duration for preventing potential future stalls. Comparatively, ABR pretesting process 64 enables the player or client media receiver 26 to calibrate an optimal ABR value under current network condition in a highly accurate manner. This, in turn, enhances responsiveness and helps ensure optimal playback of user-selected digital media content when initiating a streaming video session, as previously described.

Devices, systems, methods, and program products have thus been disclosed for enhancing responsiveness and initially optimizing ABR selection when initializing a streaming video session. Embodiments of the present disclosure anticipate the likely initiation of a media streaming session by monitoring for startup of a streaming media interface application, such as an OTT television application. When determining that the initiation of a streaming video session is likely, an optimal ABR setting is ascertained by first loading a sample video stream in the background of the OS executing the streaming media interface application. An optimal ABR indicator or "pretested bitrate" for stall-free playback of streaming media content under current network conditions is then ascertained by the client device to which the sample video stream is transmitted. When a user subsequently selects desired media content for streaming, such as a particular OTT television channel the user wishes to view, the client media receiver then selects the appropriate playlist (e.g., a variant playlist) having a bitrate less than or equal to the pretested ABR value to ensure that the user-selected streaming content is received in a rapid manner and playback of the content occurs smoothly without stall or interruption.

In certain embodiments, the method may include the steps or processes of: (i) launching a streaming media (e.g., OTT television) interface application in response to user input received at the client media receiver; (ii) substantially concurrently with launching, transmitting a request over a communications network to a streaming media server for a sample video stream; (iii) when receiving the sample video stream from the streaming media server, playing the sample video stream on the client media receiver; (iv) in response to user input requesting streaming of user-selected content stream to the client media receiver, determining an optimized ABR setting based upon a recent ABR value of the sample video stream; (v) transmitting a request to the streaming media server for the user-selected content stream at the optimized ABR setting; and (vi) presenting the user-selected content stream, when received from the streaming media server, on a display device associated with the client media receiver. In certain implementations, the method may further include presenting a graphical user interface of the streaming media interface application in a foreground window on the display device, while playing the sample video stream in a background window partially covered by the foreground window. In other implementations, the method may include the step or process of determining the optimized ABR setting by assigning the optimized ABR setting a value equivalent to the latest or most-recent ABR value of the sample video stream less a predetermined buffer value.

While several exemplary embodiments have been presented in the foregoing Detailed Description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method carried out by a client media receiver, the method comprising:
Recognizing by an indicator that the client media receiver is signaling a user intent of initiating a sample video stream, wherein the signaling of the user intent is generated prior to a user sending a request to initiate the sample video stream from a streaming media server;
in response to recognizing the indicator indicative of the user intent to initiate the sample video stream, automatically triggering an adaptive bit rate (ABR) pretesting process; and
initiating thereafter the sample video stream for streaming in a streaming video session.

2. The method of claim 1, further comprising:
initiating, thereafter while taking into account a user's viewing preference, the sample video stream for streaming in the streaming video session.

3. The method of claim 1, further comprising:
initiating the sample video stream thereafter while taking into account a user's preference for a type of event for streaming in the streaming video session, wherein the type of event comprises a sports game, and wherein an initiation is at least prior to a start of the sports game.

4. The method of claim 1, wherein the ABR pretesting process calibrates an ABR value in response to a current network condition.

5. The method of claim 1, further comprising:
predicting, by the client media receiver, a user's future intent and associated time of initiating the sample video stream or the associated time of the user to engage in the streaming video session based upon an established viewing schedule, wherein the established viewing schedule is formulated by the client media receiver based on streaming content viewed by the user at least at a time of day; and
initiating by the client media receiver the sample video stream before the associated time based on the user's predicted future intent to view or engage in the streaming video session.

6. The method of claim 1, further comprising:
predicting, by the client media receiver, a user's future intent and associated time of initiating the sample video stream or the associated time of the user to engage in the streaming video session based upon an established viewing content preference, wherein the established viewing content preference is formulated by the client media receiver based on streaming content viewed by the user according to an established viewing schedule; and
initiating by the client media receiver the sample video stream before the associated time based on the user's predicted future intent to engage in the streaming video session associated with the streaming content viewed.

7. The method of claim 1, further comprising:
in response to the user not initiating a streaming media session or streaming the sample video stream within a set period after commencement of the ABR pretesting process, or if another termination event occurs, terminating the ABR pretesting process by the client media receiver.

8. A method carried out by a client media receiver, the method comprising:
predicting an intent by the client media receiver on behalf of an end-user to initiate a streaming session, and streaming a sample video stream over a communication network;

recognizing, by an indicator by the client media receiver, signaling an intent of the end-user to initiate a sample video stream, wherein the signaling of the intent by the end-user is generated prior to the end-user sending a request to initiate the sample video stream from a streaming media server;

in response to recognizing the indicator indicative of intent of the end-user to initiate the sample video stream, automatically triggering an adaptive bit rate (ABR) pretesting process when determined by the client media receiver that the end-user is to initiate the sample video stream; and initiating, by the client media receiver, thereafter while taking into account prior viewing behavior of the end-user, the sample video stream for streaming in a streaming video session.

9. The method of claim 8, further comprising:
initiating, thereafter while taking into account content viewing preferences of the end-user, the sample video stream for streaming in the streaming video session.

10. The method of claim 8, further comprising:
initiating the sample video stream for streaming thereafter while taking into account content preference of the end-user for a type of event, wherein the type of event comprises a sports game.

11. The method of claim 8, wherein the ABR pretesting process calibrates an ABR value in response to a current network condition.

12. The method of claim 8, further comprising:
predicting, by the client media receiver, a future intent associated with a time of the end-user to engage in the streaming video session based upon an established viewing schedule of the end-user, wherein the established viewing schedule of the end-user is formulated by the client media receiver based on streaming content viewed by the end-user at least at a particular time of day; and initiating by the client media receiver the sample video stream before the associated time with the predicted future intent to view the streaming video session by the end-user.

13. The method of claim 8, further comprising:
predicting, by the client media receiver, a future intent associated with a time of the end-user to engage in the streaming video session based upon established viewing content preferences of the end-user, wherein the established viewing content preferences of the end-user are formulated by the client media receiver based on streaming content viewed by the end-user at least at a particular time of day; and initiating by the client media receiver the sample video stream before the associated time based on the predicted future intent to view the streaming video session by the end-user.

14. The method of claim 8, further comprising:
in response to an end user not initiating a streaming media session within a set period after commencement of the ABR pretesting process, or if another termination event occurs, terminating the ABR pretesting process by the client media receiver.

15. A client device utilized in conjunction with a display device, a streaming media server, and a communications network enabling bidirectional communication between the streaming media server and the client device, the client device comprising:

a processor; and
a non-transitory, computer-readable storage medium in electronic communication with the processor and configured to store computer-executable code that, when executed by the processor, causes the client device to perform a method, the method comprising:

recognizing by an indicator that the client device is signaling a user intent of initiating a sample video stream, wherein the signaling of the user intent is generated prior to a user sending a request to initiate the sample video stream from the streaming media server;

in response to recognizing the indicator indicative of the user intent to initiate the sample video stream, automatically triggering an adaptive bit rate (ABR) pretesting process when determined by the client device that the user is to initiate the sample video stream; and initiating, thereafter while taking into account a user's prior viewing behavior, the sample video stream for streaming in a streaming video session.

16. The client device of claim 15, wherein, when executed by the processor, the computer-executable code further causes the client device to:
initiate, thereafter while taking into account a user's viewing preference, for streaming the sample video stream in the streaming video session.

17. The client device of claim 15, wherein, when executed by the processor, the computer-executable code further causes the client device to:
initiate the sample video stream for streaming thereafter while taking into account a user's content preference for a type of event wherein the type of event comprises a sports game.

18. The client device of claim 15, wherein, when executed by the processor, the computer-executable code further causes the client device to:
predict a future intent associated with a time of the user to engage in the streaming video session based upon an established viewing schedule, wherein the established viewing schedule is formulated by the client device based on streaming content viewed by the user at least at a particular time of day; and initiate the sample video stream for streaming before the associated time with the predicted future intent to view the streaming video session.

19. The client device of claim 15, wherein, when executed by the processor, the computer-executable code further causes the client device to:
predict a future intent associated with a time of the user to engage in the streaming video session based upon established viewing preferences, wherein the established viewing preferences are formulated by the client device based on streaming content viewed by the user at least at a particular time of day; and initiate the sample video stream before the associated time with the predicted future intent to view the streaming video session.

20. The client device of claim 15, wherein, when executed by the processor, the computer-executable code further causes the client device to:
in response to the user not initiating a streaming media session within a set period after commencement of the ABR pretesting process, or if another termination event occurs then terminate the ABR pretesting process by the media device.

* * * * *